(12) United States Patent
Tamlin

(10) Patent No.: US 6,415,912 B1
(45) Date of Patent: Jul. 9, 2002

(54) DRIVING MECHANISM FOR SHAKING TABLE

(76) Inventor: Paul Robert Tamlin, R.R. #1, Oakwood, Ontario (CA), K0M 2M0

(*) Notice: Subject to any disclaimer, the term of this patent is extended or adjusted under 35 U.S.C. 154(b) by 0 days.

(21) Appl. No.: 09/615,332

(22) Filed: Jul. 12, 2000

(30) Foreign Application Priority Data

Jul. 12, 1999 (CA) .............................................. 2277508

(51) Int. Cl.[7] .............................................. B65G 25/04
(52) U.S. Cl. ........................................ 198/750.8; 74/66
(58) Field of Search ............................ 198/750.8; 74/66

(56) References Cited

U.S. PATENT DOCUMENTS

| | | |
|---|---|---|
| 479,742 A | 7/1892 | Hassell |
| 1,386,505 A | 8/1921 | Jacobsen |
| 2,084,090 A | 6/1937 | Kelly |
| 2,286,486 A | 8/1942 | Hill |
| 3,417,628 A | 12/1968 | Paul, Jr. |
| 3,436,971 A | 4/1969 | Gavrila |
| 3,486,608 A | 12/1969 | Rogers |
| 3,586,174 A | 6/1971 | Hall |
| 3,869,927 A | 3/1975 | Lose et al. |
| 3,872,733 A * | 3/1975 | Sanderson ...................... 74/66 |
| 4,295,780 A | 10/1981 | Wada et al. |
| 5,046,602 A | 9/1991 | Smalley et al. |
| 5,178,258 A | 1/1993 | Smalley et al. |
| 5,419,213 A * | 5/1995 | Karlyn et al. .................. 74/437 |
| 5,699,897 A | 12/1997 | Svejkovsky |
| 5,794,757 A | 8/1998 | Svejkovsky et al. |
| 5,850,906 A | 12/1998 | Dean |

* cited by examiner

Primary Examiner—Stephen T. Gordon
Assistant Examiner—Lori L Coletta
(74) Attorney, Agent, or Firm—Birch, Stewart, Kolasch & Birch, LLP

(57) ABSTRACT

The driving mechanism has a drive shaft which rotates a driving block. A cam is mounted for rotation to the driving block and is received in a slot of a follower. As the cam rotates, it rolls backwards and forwards in the slot and causes the follower to rotate. A connecting rod is affixed to the follower and is rotated by it. The connecting rod rotates about an axis parallel to, but offset from, the axis about which the drive shaft rotates. The rate of rotation of the drive shaft is unvarying whereas the connecting rod rotates at a varying rate. A crank is affixed to the connecting rod and imparts reciprocating motion to the tray. A link can be substituted for the cam.

5 Claims, 9 Drawing Sheets

DRIVING MECHANISM FOR SHAKING TABLE

BACKGROUND OF THE INVENTION

This invention relates to an apparatus for causing material to advance from one stage to the next in a manufacturing process. More particularly the invention relates to an apparatus for causing particulate consumables such as potato chips, corn flakes and particulate non-consumables such as pieces of scrap metal to advance on a tray from one stage to the next in the manufacture of a product.

In the manufacture of particulate consumables, conveyors are required to move the product from one step in the process to the next. If the consumable is relatively strong such as rice, sugar, salt, it can usually be moved on conventional vibrating trays but if the product is fragile such as potato chips and corn flakes, such trays will cause the product to break into smaller pieces. The smaller the pieces, the less commercially acceptable is the finished product is.

SUMMARY OF THE INVENTION

The driving apparatus of the present invention causes a shaking tray to reciprocate. There is provision for adjusting the way in which the tray reciprocates so that the tray can made to reciprocate jerkily or smoothly. Thus breakable consumables such as those mentioned above can be caused to advance smoothly on the tray from one stage to the next in their manufacture and from the final step to the bagging or packaging operation. Minimal breakage of the product occurs while it is being moved on the tray.

The apparatus of the invention can be broadly described as a driving apparatus for a shaking tray on which particulate material advances. One embodiment of the driving apparatus comprises a cam rotated by a drive shaft and a follower having a slot formed therein for receipt of the cam. As the cam rotates, it rolls backwards and forwards in the slot and imparts rotation to the follower. A connecting rod is affixed to the follower and is rotated thereby. The connecting rod has an axis of rotation parallel to, but offset from, the axis of rotation of the drive shaft. A crank is affixed to the connecting rod and is operatively connected to the shaking tray for imparting reciprocating motion to the tray.

A second embodiment of the driving apparatus comprises a link which is rotated by a drive shaft and which is rotatable about an axis offset from the axis of rotation of the drive shaft. A follower is rotatably mounted to the link and is caused to rotate by the link as the link is rotated by the drive shaft. A connecting rod is affixed to the follower and is rotated thereby. The connecting rod has an axis of rotation parallel to, but offset from, the axis of rotation of the drive shaft. A crank is affixed to the connecting rod and is operatively connected to the shaking tray for imparting reciprocating motion to the tray.

DESCRIPTION OF THE DRAWINGS

The apparatus of the invention is described with reference to the accompanying drawings in which.

Like reference characters refer to like parts throughout the description of the drawings.

DESCRIPTION OF THE PREFERRED EMBODIMENTS

Figure 1:
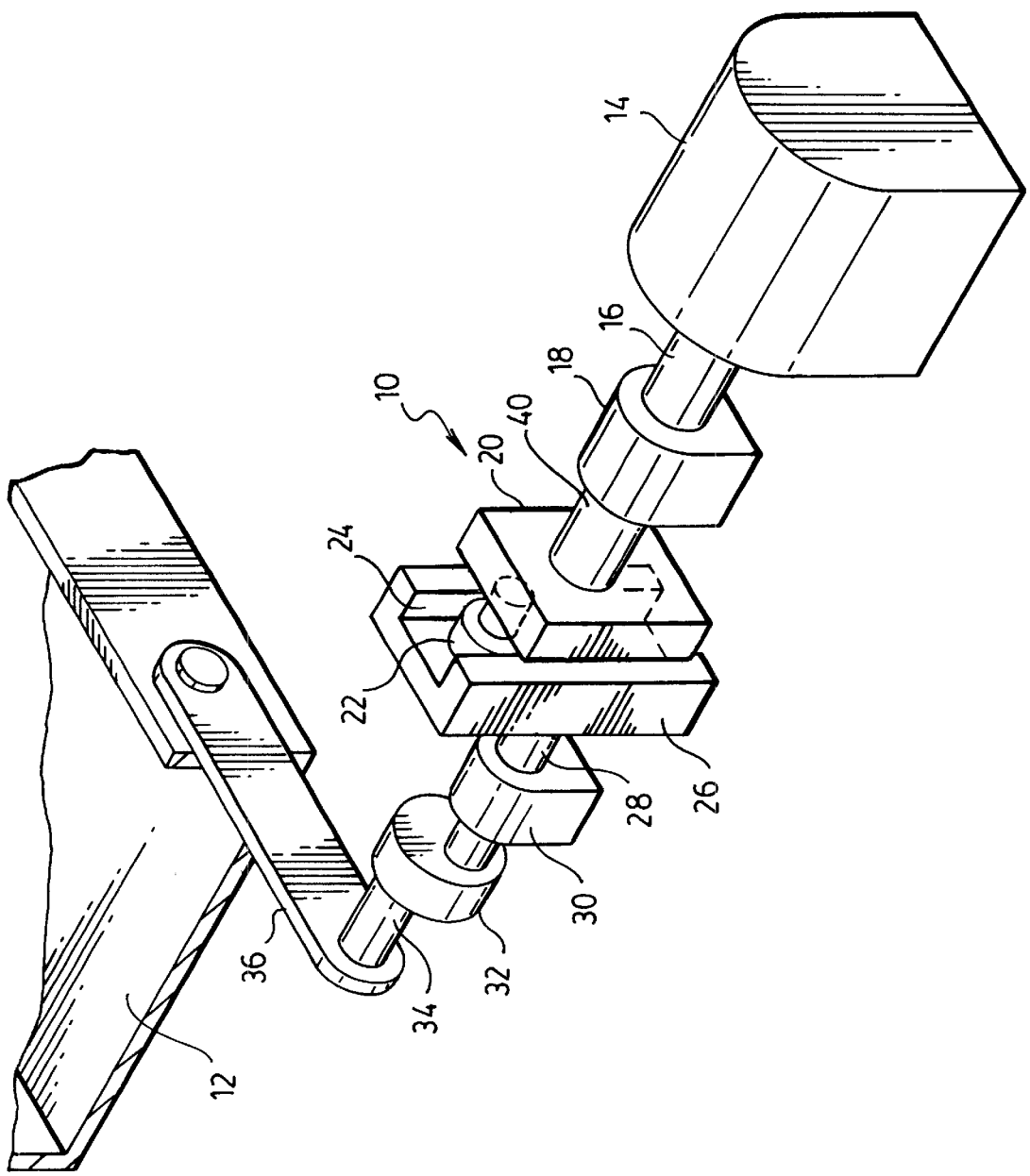
FIG. 1 is a perspective view of components of the first embodiment of the driving apparatus of the invention.
Figure 2:
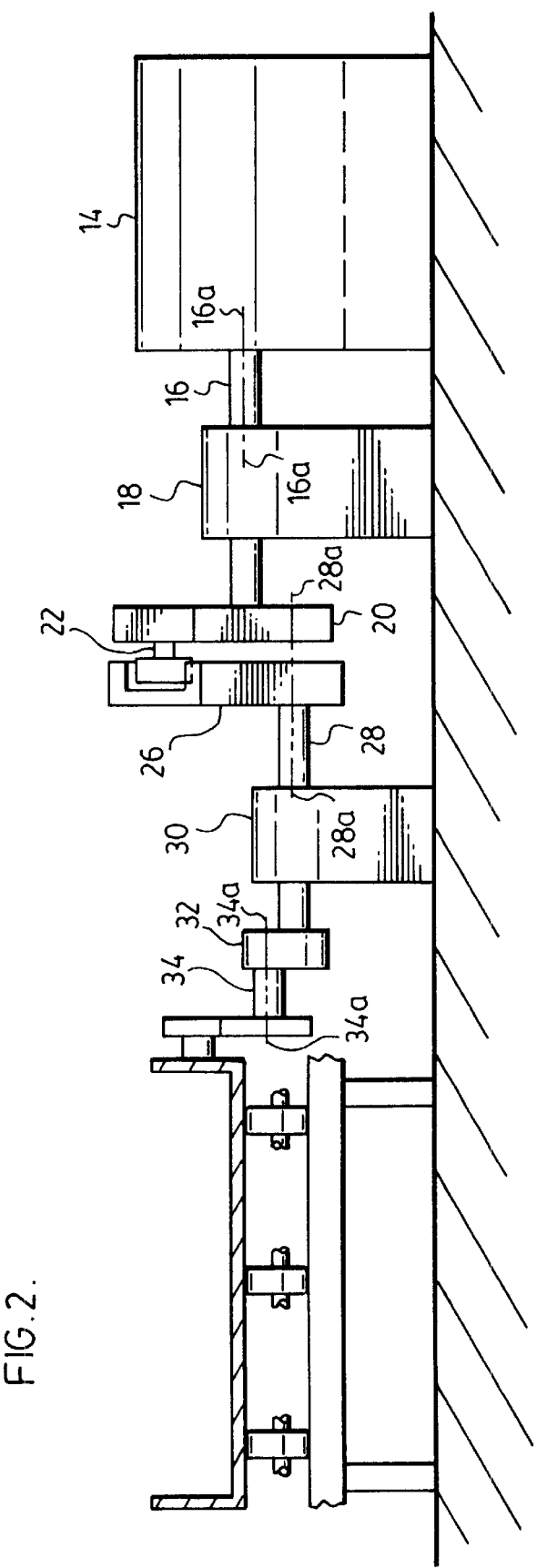
FIG. 2 is an elevation of the components illustrated in FIG. 1.

With reference to FIGS. 1 and 2, the driving apparatus of the invention, generally 10, is shown in conjunction with a tray 12. The driving apparatus includes a motor 14 which rotates a drive shaft 16. The shaft is mounted in bearings in housing 18 and is connected to a rotating driving block or member 20.

A cam 22 is mounted in bearings on the driving block and is positioned eccentrically with respect to the axis of rotation 16a—16a of the drive shaft. The cam is accommodated in a vertically extending slot 24 formed in a driven block or follower 26.

The follower is affixed to a connecting rod 28. The connecting rod is mounted in bearings in housing 30 and rotates about an axis of rotation 28a—28a. That axis is offset from the axis of rotation 16a—16a of the drive shaft but is parallel to it.

A crank 32 is affixed to the connecting rod 28. A wrist pin 34 is affixed to the crank and is mounted in bearings in an arm 36. The arm is pivotally connected to tray 12.

Figure 3:
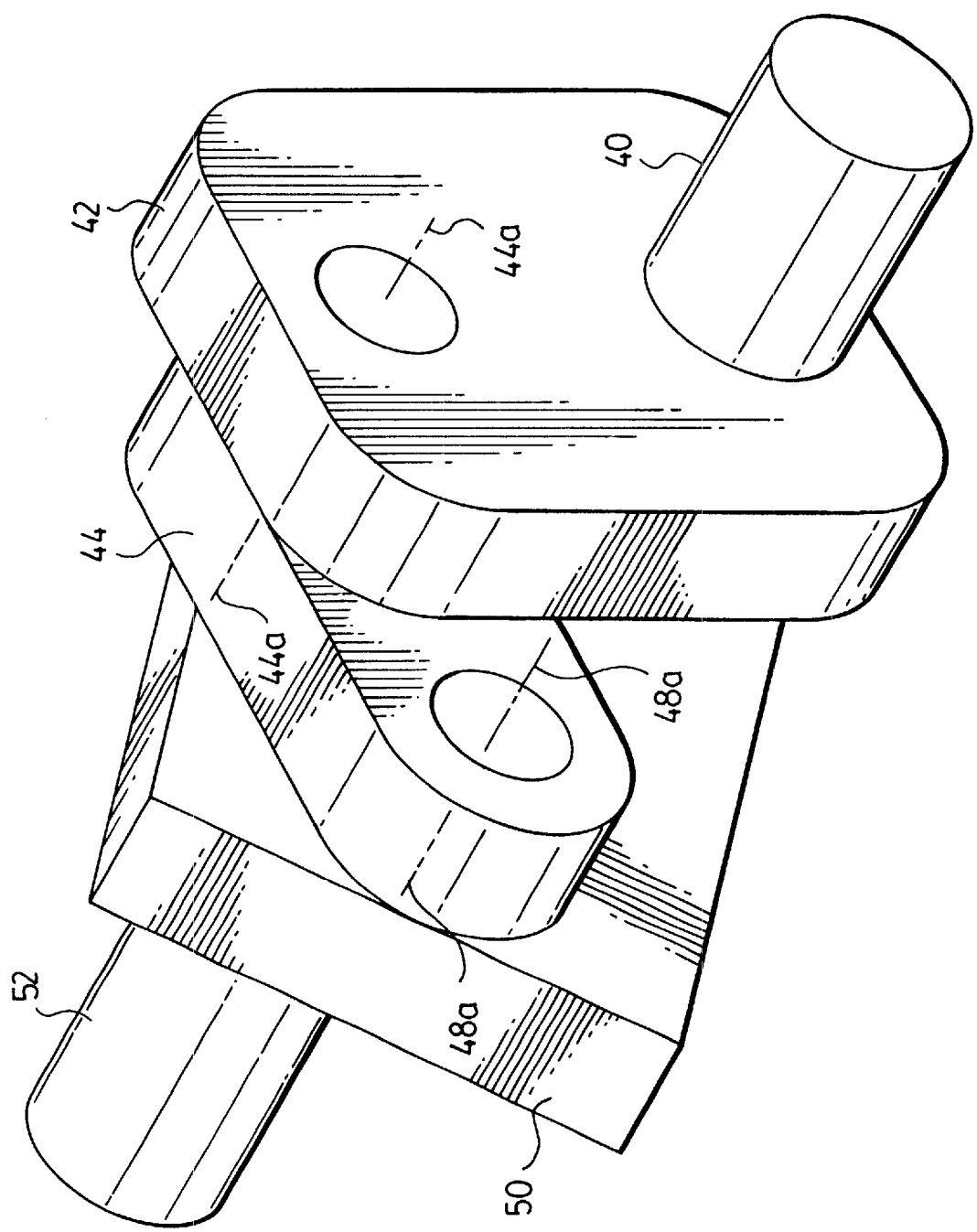
FIG. 3 is a perspective view, in enlarged scale, of a portion of the second embodiment of the driving apparatus of the invention.

With reference to FIG. 3, a drive shaft 40 is affixed to a rotating driving block or member 42. A link 44 is rotatably mounted in bearings to the block to rotate about axis 44a—44a. The link is also rotatably mounted in bearings to a driven block or member 50 to rotate about an axis 48a—48a. A connecting rod 52 is affixed to the follower.

The axis of rotation 44a—44a of the link is offset from the axis of rotation of drive shaft 40 and the axis of rotation of the connecting rod 52 is also offset from the axis of rotation of the drive shaft.

The mechanism illustrated in FIG. 3 may be substituted for the drive shaft 16, block and follower 20 and 26 and the connecting rod 28 of FIGS. 1 and 2. Thus, link 44 of FIG. 3 substitutes for cam 22 of FIGS. 1 and 2.

Figure 4:
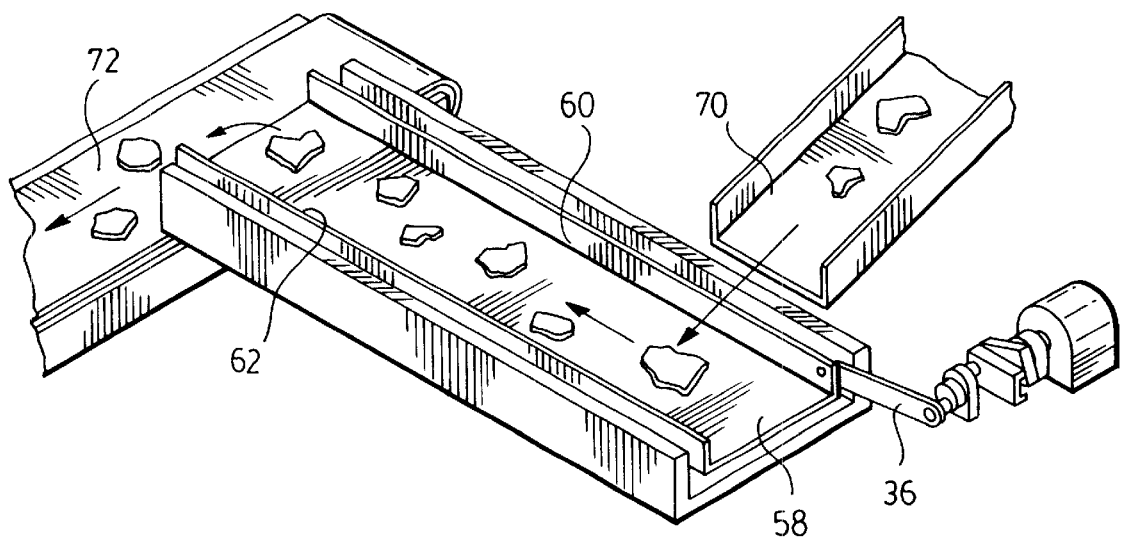
FIG. 4 is a perspective view, in smaller scale than that of the preceding Figures, of the driving apparatus illustrated in FIGS. 1 and 2 together with a tray which is reciprocated by the driving apparatus.
Figure 5:
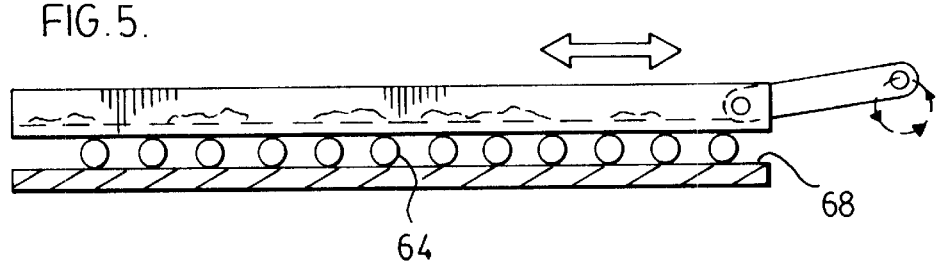
FIG. 5 is an elevation of the tray.
Figure 6:
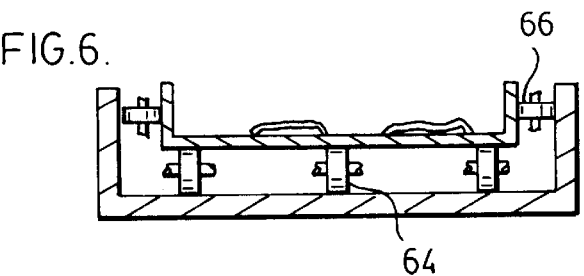
FIG. 6 is an end view of the tray.

With reference to FIGS. 4 to 6, the tray has a lower wall 58 and side walls 60, 62. Arm 36 is pivotally connected to side wall 60. The lower wall rests on rollers 64 and the side walls contact side rollers 66 to ensure that the tray remains centred within a stationary bed 68 as it reciprocates.

A first conveyor belt 70 carries particulate material to the tray and deposits it on the lower wall and a second conveyor belt 72 carries material which discharges from the tray.

The position of the components of the first embodiment of the driving mechanism as the connecting rod rotates incrementally is illustrated in FIGS. 7 to 12. In FIGS. 7 to 11, the shaft rotates in increments of 45 degrees and in FIG. 12, in an increment of 90 degrees from the previous Figure.

Figure 7:
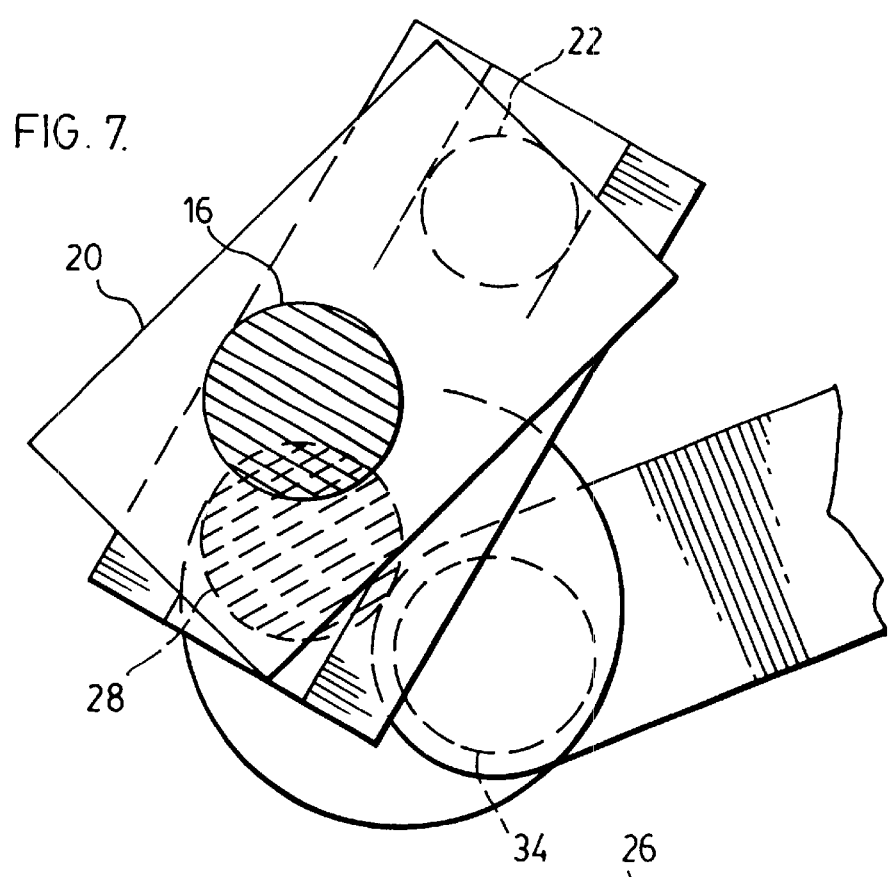
FIGS. 7 to 12 are enlarged fragmentary end views of the components of the first embodiment of the driving apparatus as the drive shaft rotates.

With reference first to FIG. 7, the driving block 20 is shown in the 2:00 o'clock position with respect to drive shaft 16 and the cam 22, being connected to the driving block is likewise in the 2:00 o'clock position. The wrist pin 34 rotates about the connecting rod 28 and is shown in the 4:00 o'clock position.

It will be noted in FIG. 7 that the axes of the drive shaft 16, the connecting rod 28, and the wrist pin 34 are all offset from each other. It should also be noted that the drive shaft and connecting rod rotate about their own axes but the wrist pin does not. The pin is affixed to the crank and does not rotate about its axes. It does however rotate about the axis of the connecting rod.

Figure 8:
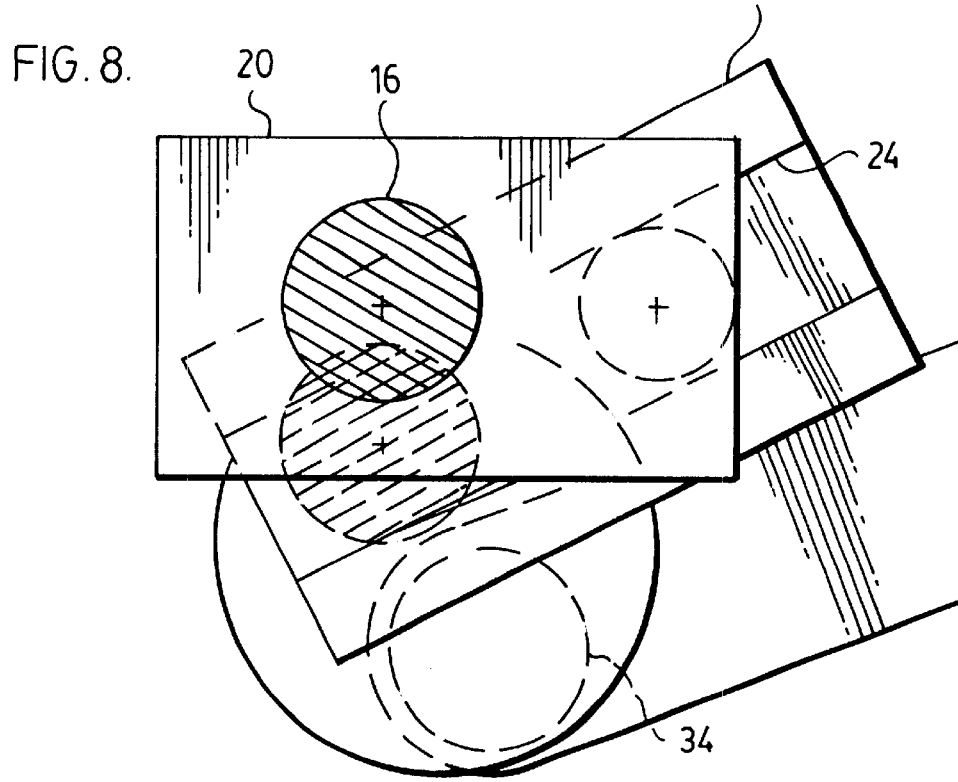

In FIG. 8, the drive shaft 16 has rotated clockwise 45 degrees from the position illustrated in FIG. 7 and the driving block 20 has likewise rotated 45 degrees. The cam has rolled toward the left in the slot 24 of follower 26 from the position illustrated in the previous Figure and the wrist pin 34 has rotated about 22 degrees from the position illustrated in FIG. 7.

Figure 9:
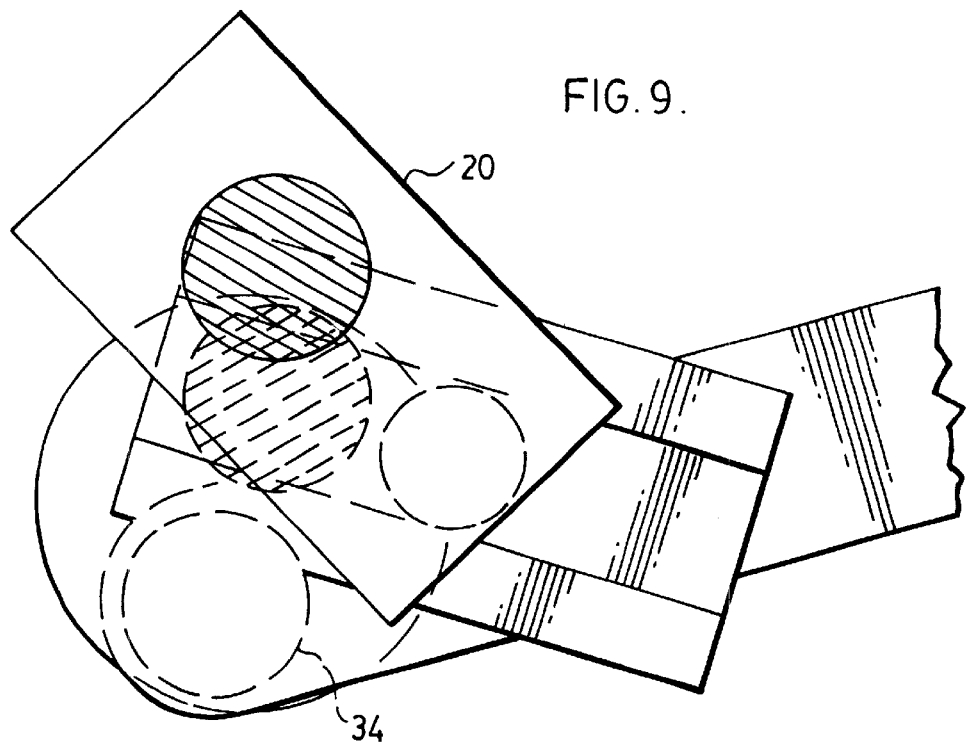

In FIG. 9, driving block 20 has rotated a further 45 degrees and is now in the 4:00 o'clock position. The wrist pin 34 has rotated about 30 degrees from the position illustrated in the previous Figure and is now in the 7:00 o'clock position.

Figure 10:
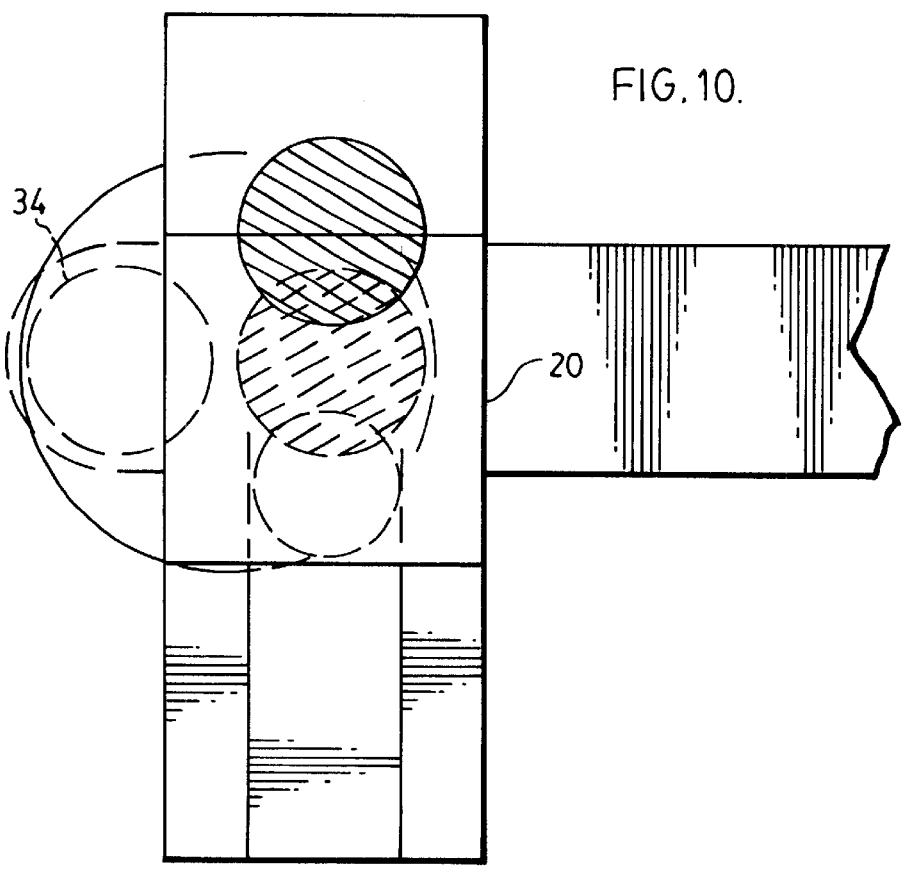

In FIG. 10 driving block 20 is now in the 6:00 o'clock position but wrist pin 34 has rotated 90 degrees from the position illustrated in the previous Figure. Thus a rotation of 45 degrees of the drive shaft has caused a 90 degree rotation of the wrist pin.

Figure 11:
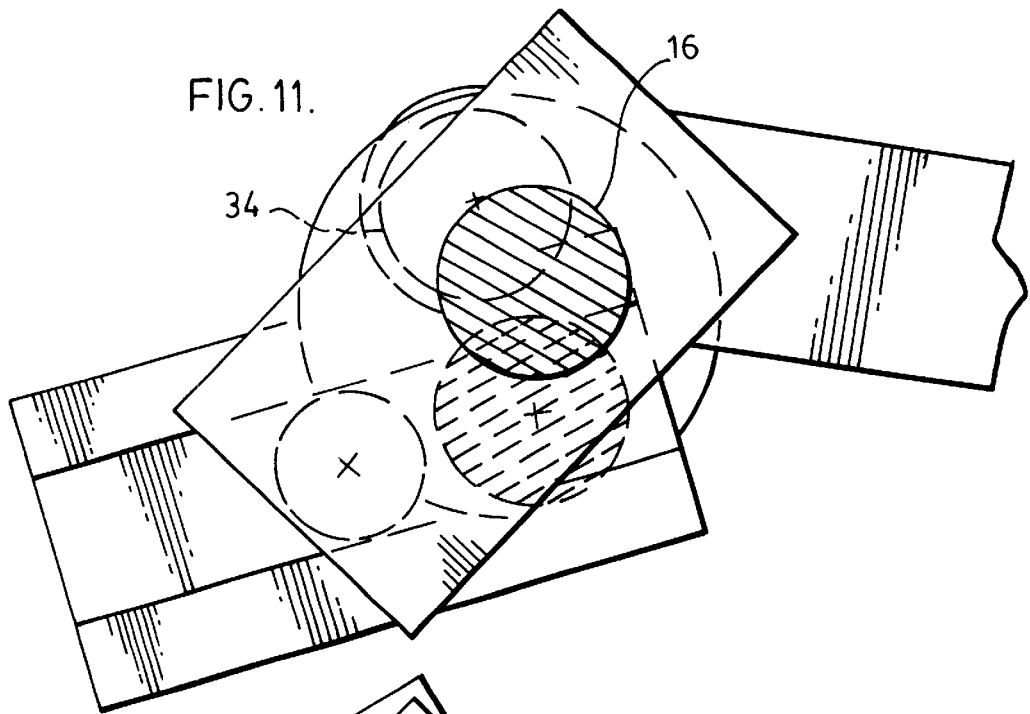
Figure 12:
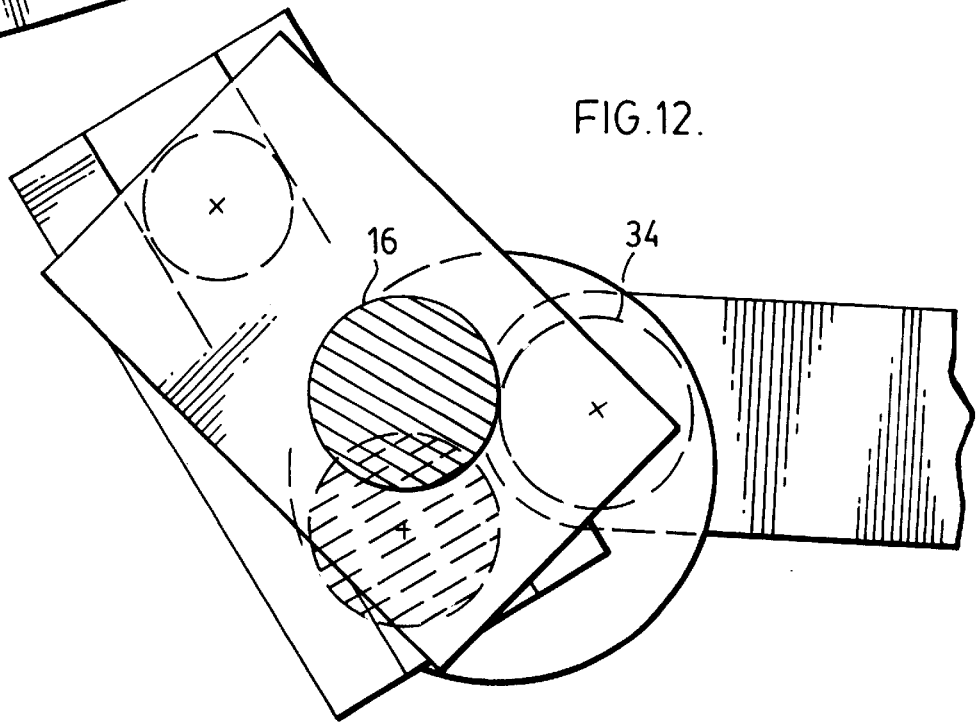

In FIG. 11, drive shaft 16 has again rotated about 45 degrees and caused a 90 degree rotation of wrist pin 34 but in FIG. 12 the reverse has occurred. Drive shaft 16 has rotated 90 degrees from the position illustrated in the previous Figure but wrist pin 34 has rotated only about 45 degrees. As the drive shaft rotates a further 90 degrees from the position illustrated in FIG. 12 to the position illustrated in FIG. 7, the wrist pin rotates only about 45 degrees.

Thus rotation of the drive shaft at a unvarying rate causes a varying rate of rotation of the wrist pin. At times the wrist pin rotates more slowly and at other times it rotates more quickly. Such uneven movement of the wrist pin causes the tray to move in a similar manner and such movement causes particles on the tray to advance when the tray is moving slowly forward and to remain stationary when it is jerked backward.

The operation of the drive mechanism may be summarized as follows. As the drive shaft rotates, so too does the cam. The cam also rolls backwards and forward in the slot. Such motion causes the follower to rotate but the rate of rotation of the follower is irregular because of the offset between the axes of the drive and connecting rods. This irregular movement causes a like movement in the wrist pin.

The irregularity in the movement of the wrist pin can be altered by adjustment in the spacing between the axes of the drive and connecting rods and the spacing between the axes of the output and wrist pins. Thus if the movement is so violent or jerky that the particles on the tray are damaged, the spacing can be altered to reduce the jerkiness or violence.

The wrist pin thus rotates relatively slowly in one direction then rapidly in the opposite direction and such movement causes the tray to reciprocate rapidly in one direction and slowly in the opposite. Such movement will cause particulate material on the tray to move down the tray with little damage to the material.

Figure 13:
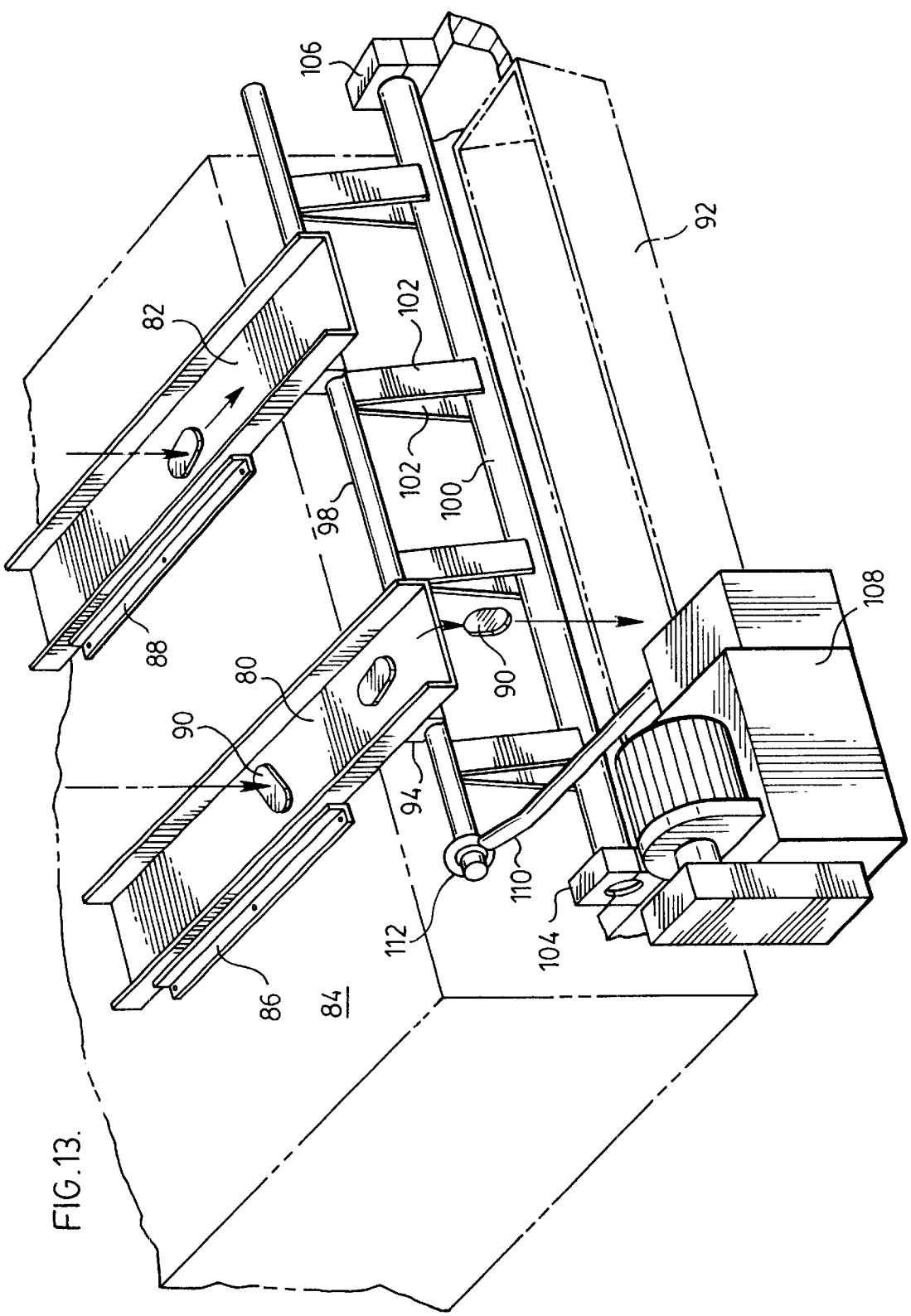
FIG. 13 is a perspective view of a second embodiment of the driving apparatus of the invention in conjunction with a number of trays.
Figure 14:
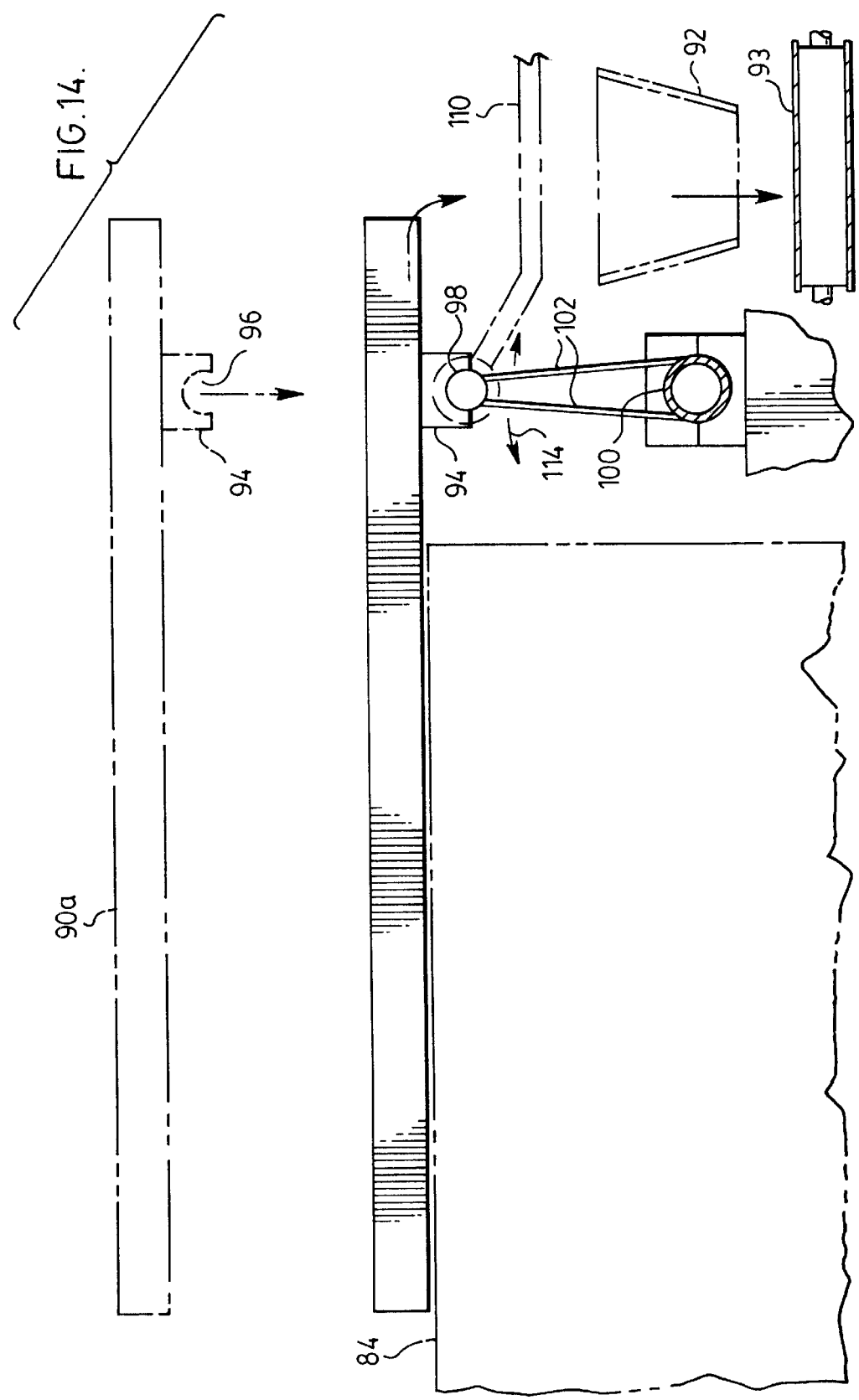
FIG. 14 is an elevation of a tray and a portion of the driving mechanism illustrated in FIG. 13.

With reference to FIGS. 13 and 14, trays 80, 82 rest on the upper wall of a bed 84 and slide forward and backward on the bed. Guide rails 86, 88 and like rails on the opposite sides of the trays prevent the trays from moving laterally. Particulate material such as slugs or blanks 90 drop onto the trays and are deposited in a bin 92. The material discharges from the bin into a storage container 93.

A drive block 94 is mounted to the lower wall of each tray. The block has a concave lower wall 96 of the same curvature as the outer wall of an oscillating bar 98 which extends beneath the tray. The bar is accommodated in the concave space of the block and gravity ensures that the bar remains in the space as the bar oscillates. The length of the oscillating bar can be varied according to the number of trays that are to be attached to it.

A second rotating bar 100 is located beneath the oscillating bar. A number of spacers 102 interconnect the two bars and maintain them in a spaced parallel relationship. The rotating bar 100 is mounted in bearings 104, 106 and is free to rotate back and forth in the bearings.

As illustrated in FIG. 14, the drive block of the tray merely rests on the oscillating bar. Otherwise it is not connected to the bar or to the bed. Should it be necessary to move the tray along the bed, it is simply lifted as at 90a, moved along the bar and placed between a pair of guide rails further along the bed. The tray may also be removed from the bar altogether without disconnecting it from the bar or the bed.

The apparatus 108 for producing reciprocation has the same components as the apparatus illustrated in FIGS. 1 and 2. The apparatus has a coupling or arm 110 similar to arm 36 illustrated in those Figures. An eyelet 112 is attached to the forward end of the coupling and receives the end of the oscillating bar. The bar is thus attached to the coupling and is caused to reciprocate by it but is free to pivot in the eyelet.

In operation, coupling 110 causes bar 98 to oscillate in the direction of arrows 114 in FIG. 14. That bar is supported by the rotating bar 100 which rotates first clockwise then counter-clockwise in the bearings.

Considerable play between the coupling and the oscillating bar is possible without detrimentally affecting the shaking operation. For example, the angle between the longitudinal axes of the coupling and the oscillating bar need not be 90 degrees but may be somewhat more or less than that. Where more deviation of the angle is required, a conventional spherical tie rod can be used to join the two parts.

Thus careful positioning of the components of the bars and reciprocating mechanism 108 is not necessary for the mechanism to function. Considerable latitude is possible in the choice of location of the components. As a result less time is necessary to position the components than would be the case if their positions relative to each other had to be carefully adjusted.

It will be understood of course that modifications can be made in the preferred embodiments illustrated and described herein without departing from the scope and purview of the invention as defined in the appended claims.

I claim:

1. A driving apparatus for a shaking tray on which particulate material advances, comprising a cam; a drive shaft rotating about an axis and causing said cam to rotate; a follower having a slot formed therein for receipt of said cam, said cam as it rotates, moving backward and forward in said slot and imparting rotation of 360 degrees to said follower; a connecting rod affixed to said follower and being rotated 360 degrees thereby upon rotation of said follower, said connecting rod rotating about a stationary axis parallel to but offset from the axis of rotation of said drive shaft; a crank connected to said connecting rod and adapted to be operatively connected to the shaking tray for imparting reciprocating motion to said tray upon rotation of said crank by said connecting rod.

2. The driving apparatus as claimed in claim 1 wherein said operative connection includes: a coupling rotatably connected to said crank; a bar mounted to oscillate and being connected to said coupling, said shaking tray being adapted to be operatively connected to said bar and to be reciprocated thereby.

3. The driving apparatus as claimed in claim 1 wherein said operative connection includes: a coupling rotatably connected to said crank; a pair of parallel oscillating and rotating bars; at least one spacer which interconnects said bars and maintains said bars in a spaced relationship, said rotating bar being mounted for rotation and said oscillating bar being pivotally connected to said coupling and being caused to reciprocate thereby, said shaking tray being adapted to be operatively connected to said oscillating bar and to be reciprocated thereby.

4. The driving mechanism as claimed in claim 3 wherein said operative connection between said oscillating bar and said shaking tray includes: a drive block adapted to be connected to said shaking tray and having a wall seated upon said oscillating bar, said oscillating bar imparting linear movement to said drive block.

5. The driving apparatus as claimed in claim 1 further including a wrist pin mounted for rotation to said crank, said pin having means for pivotal connection to said shaking tray.

* * * * *